United States Patent [19]
Lewis

[11] 3,795,424
[45] Mar. 5, 1974

[54] DECELERATION RESPONSIVE PROPORTIONING VALVE FOR VEHICLE BRAKING SYSTEM

[75] Inventor: Richard L. Lewis, South Bend, Ind.

[73] Assignees: The Bendix Corporation, South Bend, Ind.

[22] Filed: Aug. 16, 1971

[21] Appl. No.: 171,929

[52] U.S. Cl. .............................. 303/6 C, 303/24 F
[51] Int. Cl. ............................................. B60t 13/06
[58] Field of Search ...... 303/6 C, 24 R, 24 A, 24 B, 303/24 C, 24 F, 24 BB, 21 CG, 21 F, 24, 21 C; 188/349, 181 A; 137/48, 82, 85, 86, 38

[56] References Cited
UNITED STATES PATENTS

| | | | |
|---|---|---|---|
| 3,317,251 | 5/1967 | Hambling et al. | 303/24 A |
| 3,455,609 | 7/1969 | Bratten | 303/24 C |
| 3,147,045 | 9/1964 | Stelzer | 303/24 F |
| 3,489,465 | 1/1970 | Bueler | 303/24 C |
| 3,398,757 | 8/1968 | Milster | 303/24 C X |
| 3,385,308 | 5/1968 | Farr | 303/24 C X |
| 3,377,108 | 4/1968 | Eddy | 303/24 C |

*Primary Examiner*—Duane A. Reger
*Assistant Examiner*—D. C. Butler
*Attorney, Agent, or Firm*—Ken C. Decker; William N. Antonis

[57] ABSTRACT

A proportioning valve for a vehicle braking system is disclosed which includes a pair of valve members slidably disposed within a housing and cooperating with the latter to define an inlet chamber connected to the vehicle's master cylinder and an outlet chamber in fluid communication with the rear wheel brakes of the vehicle. The valve members initially permit uninhibited fluid communication between the inlet and outlet chambers until a predetermined relationship exists between vehicle deceleration and the pressure level in the valve, whereupon the valve members cooperate with one another to restrict fluid communication between the inlet and the outlet chambers to thereby establish a lower fluid pressure level in the outlet chamber than the fluid pressure level established in the inlet chamber.

13 Claims, 2 Drawing Figures

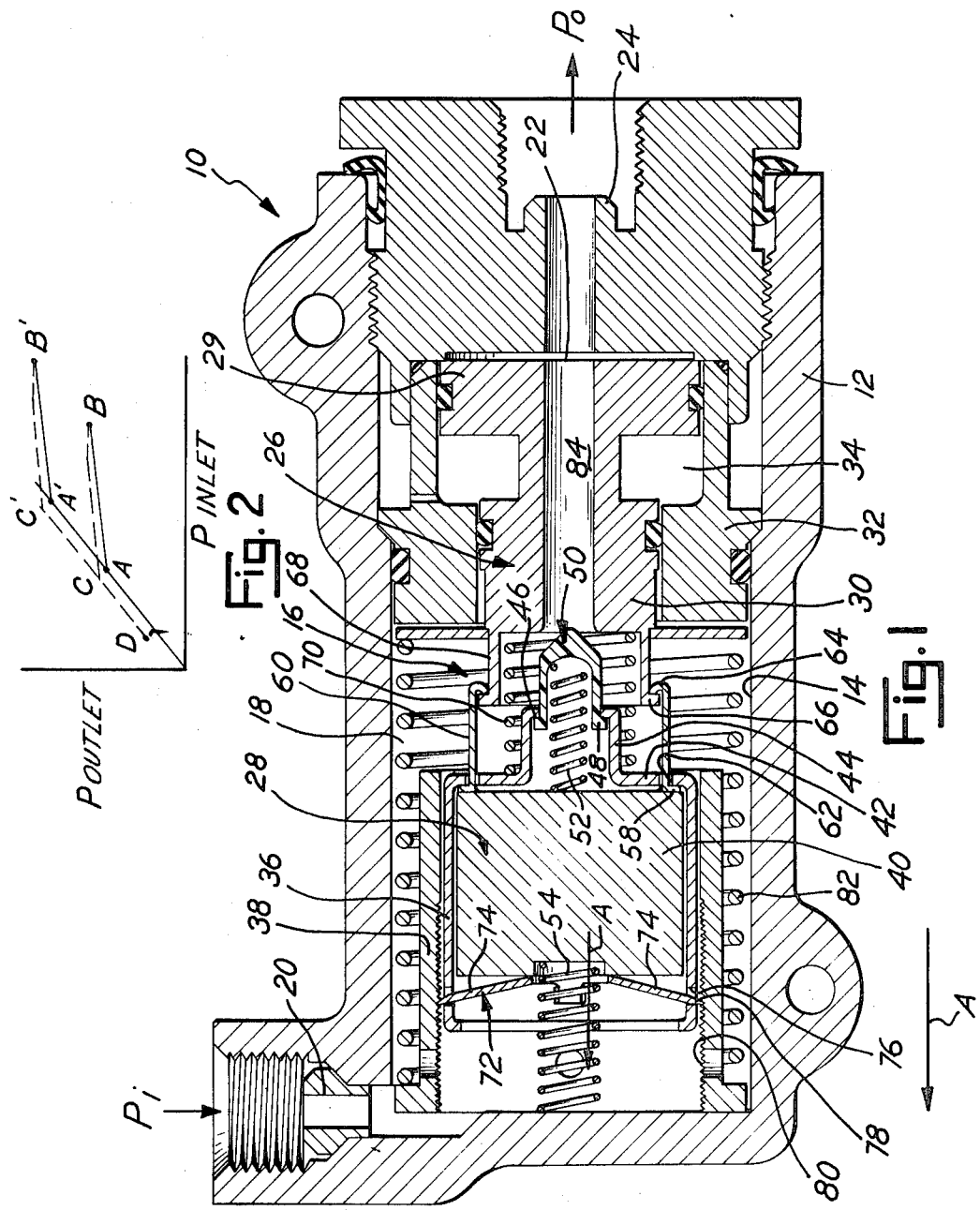

DECELERATION RESPONSIVE PROPORTIONING VALVE FOR VEHICLE BRAKING SYSTEM

BACKGROUND OF THE INVENTION

This invention relates to a proportioning valve for use in a vehicle hydraulic braking system.

When a vehicle is decelerated, rotation of the vehicle about its center of mass transfers a substantial portion of the weight of the vehicle from the rear wheels to the front wheels. Therefore, the front wheel brakes of the vehicle may exert a greater proportion of the total braking effort when the vehicle is decelerated than do the brakes on the rear wheels of the vehicle. Since a substantial proportion of the vehicle's weight is transferred from the rear wheels of the vehicle, the rear wheel brakes have a tendency to "lock up" during a deceleration. Therefore, it has become customary to provide a proportioning valve in the rear brake line that reduces the braking pressure delivered to the rear wheel brakes. Since the braking effort required of the rear wheel brakes depends upon the weight carried by the rear wheels of the vehicle, it has become customary, particularly in commercial vehicles, to provide a proportioning valve which is responsive to the load carried by the rear wheels of the vehicle, so that the valve begins its proportioning effect at a higher braking pressure when the vehicle is heavily loaded and at a lower braking presure when the vehicle is unloaded. However, prior art load sensing proportioning valves require rather cumbersome connections to the rear axle and body of the vehicle so that the load may be properly sensed. Furthermore, the proportioning effect of the valve can only approximate the ideal braking pressure distribution between the front and rear wheels of the vehicle.

SUMMARY OF THE INVENTION

Therefore, an important object of my invention is to provide a proportioning valve which initiates its proportioning effect whenever a predetermined relationship exists between vehicle deceleration and the fluid presure level communicated to the valve, regardless of the load carried by the vehicle.

Another important object of my invention is to provide a proportioning valve which initiates its proportioning effect at a relatively low pressure level when the vehicle is unloaded and at successively higher pressure levels as the load carried by the vehicle is increased.

A further object of my invnetion is to provide a proportioning valve which produces a similar effect as a load sensing proportioning valve, but which does not require any external connections to the chassis or body of the vehicle.

BRIEF DESCRIPTION OF THE DRAWINGS

FIG. 1 is a longitudinal cross-sectional view of a proportioning valve made pursuant to the teachings of my present invention; and FIG. 2 is a graphical representation of the operation of the valve illustrated in FIG. 1.

DETAILED DESCRIPTION

A proportioning valve generally indicated by the number 10 includes a housing 12 defining a bore 14 therewithin. Valve means generally indicated by the numeral 16 divide the bore 14 into an inlet chamber 18 which is connected to the vehicle's master cylinder through an inlet port 20 and an outlet chamber 22 which is connected to the rear wheel brakes of the vehicle through an outlet port 24.

Valve mean 16 includes a first valve member 26 and a second valve member 28. The valve member 26 is stepped to define a larger diameter end 29 which is exposed to the fluid pressure level in the outlet chamber 22 and a smaller diameter end 30 which is exposed to the fluid pressure level in the inlet chamber 18. A fixed guide member 32 secured within the housing 12 guides the valve member 26 for reciprocation within the housing 12. As will be understood by those skilled in the art, the chamber 34 defined between the stepped portion of the valve member 26 and the guide member 32 is vented to the exterior of the housing 12. Therefore, the valve member 26 presents a larger effective area exposed to the fluid pressure level in the outlet chamber 22 and a smaller effective area exposed to the fluid pressure level in the chamber 18.

The valve member 28 includes a compartment 36 which is slidably received within an annular guide member 38 provided within the bore 14 The compartment 36 receives a mass 40 which is made from a relatively dense material. The compartment 36 includes an inwardly extending portion 42 from which an annular portion 44 extends projecting toward the first valve member 26. The annular portion 44 terminates in an inwardly projecting flange 46 which is adapted to engage an outwardly projecting flange 48 carried on a resilient poppet member generally indicated by the numeral 50. A spring 52 yieldably urges the flange 48 into engagement with the flange 46. Another spring 54 is disposed between the mass 40 and the left-hand end of the bore (viewing FIG. 1). The spring 54 yieldably urges the mass 40 toward the portion 42 of the compartment 36. A washer 58 is confined between the end of the mass 40 and the portion 42 of the compartment 36. A plurality of fingers 60 extend from the washer 58 through openings 62 provided in the annular portion 42 of the housing 36. The fingers 60 terminate in inwardly extending detents 64 which are adapted to engage corresponding detents 66 which project radially outwardly from fingers 68 carried by the valve member 26. Therefore, the detents 64 cooperate with the detents 66 in such a manner that relative movement of the valve members 26 and 28 toward one another is permitted, but relative movement between the valve members 26 and 28 away from one another in excess of a predetermined distance is prevented. A spring 70 is disposed between the valve members 26 and 28 to yieldably urge the detents 64 into engagement with the detents 66.

A resilient clip generally indicated by the numeral 72 includes a plurality of fingers 74 which extend through apertures 76 provided in the compartment 36. One end of each finger 74 engages the left hand end (viewing FIG. 1) of the mass 40 and the other end of each finger 74 which extends through the apertures 76, terminates in a pointed end 78 which is adapted to engage serrations 80 provided in the inner circumferential surface of the guide member 38. The pointed ends 78 of the fingers 74 are urged into engagement with the serrations 80 by movement of the mass 40 to the left viewing FIG. 1, which deflects each finger 74 radially outwardly. After the pointed ends 78 engage the serrations 80, the compartment 36, and therefore the mass 40, are locked against further movement relative to the housing 12. A spring 82 within the bore 14 is operably connected to the valve member 26 and yieldably urges the latter into engagement with the right hand end of the bore 14 (viewing FIG. 1). Because of the engagement of the detents 64 with the detents 66, the spring 82 also urges the valve member 28 to the predetermined position illustrated in FIG. 1 when the brakes of the vehicle are released.

MODE OF OPERATION

The various components of the valve member 10 are illustrated in FIG. 1 disposed in the position which they assume when the brakes of the vehicle are released. The valve is mounted on the vehicle with the axis of the bore 14 in substantial axial alignment with the longitudinal axis of the vehicle and with the left hand end of the valve 10 (viewing FIG. 1) pointing toward the front of the vehicle. When a brake application is effected, braking pressure is communicated into the inlet chamber 18 from the vehicle's master cylinder and is communicated directly to the outlet chamber 22 through the passage 84 extending through the valve member 26. Therefore, the braking pressure delivered to the rear wheel brakes of the vehicle is substantially the same as the pressure level generated in the vehicle's master cylinder.

Although the fluid pressure level in the inlet chamber 18 is substantially equal to the pressure level in the outlet chamber 22, a net force acts on the valve member 26 opposing the force exerted by spring 82 urging the member 26 to the left (viewing FIG. 1) since the area of the end of the valve member 26 exposed to the fluid pressure in outlet chamber 22 is greater than the area of valve member 26 exposed to the fluid pressure in the inlet chamber 18. Since the spring 70 maintains the detents 64 and 66 in engagement with one another, movement of the valve member 26 also moves the valve member 28.

As the vehicle is decelerated, the mass 40 is accelerated in the direction of arrow A. When the force generated by acceleration of the mass 40 is sufficient to overcome the force exerted by the spring 54 resisting movement of the mass, the mass 40 moves to deflect the fingers 74 to urge the pointed ends 78 of the latter into locking engagement with a corresponding one of the serrations 80. When this occurs, the valve member 28 is locked against further movment relative to the bore 14. Since the force exerted by the spring 54 resisting movement of the mass 40 increases as the spring is compressed, it is apparent that the mass must be accelerated at a greater rate to lock the valve member 28 to the bore 14 when higher fluid pressures are communicated into the bore 14 to move the valve members 26, 28 a greater distance to the left thereby compressing springs 54 and 82 a greater amount than when relatively low fluid pressures in the bore 14 move the valve members a relatively small distance to the left thereby compressing springs 54 and 82 a lesser amount. Therefore, the point at which the valve member 28 is locked to the bore 14 is dependent upon a predetermined relationship between the fluid pressure level communicated into the bore 14 and the rate of acceleration of the mass 40, which is directly related to the rate of deceleration of the vehicle.

After the mass 40 is locked against further movement relative to the bore 14, the valve member 26 moves relative to the valve member 28 due to the fluid pressure acting across the differential area of the valve member 26. The valve member 26 moves into sealing engagement with the poppet 50, thereby terminating fluid communication between the inlet and outlet chambers. Assuming that the vehicle is lightly loaded, the required deceleration of the mass 40 to lock the compartment 36 to the guide member 38 will be achieved when a relatively low fluid pressure level exists within the housing 12. This state is represented by point A in FIG. 2. However, if the vehicle is heavily loaded, the point at which the valve member 28 is locked against the guide member 38 and in which the valve member 26 first engages the poppet 50 will not occur until a substantially higher fluid pressure level is achieved within the bore 14, as represented by the point A' on FIG. 2, since greater braking pressure is required to decelerate a heavy vehicle.

After the valve member 26 initially closes into sealing engagement with the poppet member 50, subsequent increases in the pressure level in the inlet chamber 18 will cause the valve member 26 to move away from the poppet 50 to permit fluid to flow from the inlet chamber 18 into the outlet chamber 22. However, only a portion of the fluid pressure level increase in the inlet chamber 18 will be communicated into the outlet chamber 22, because of the differential area across the valve member 26. Therefore, a lower fluid pressure level is established in the outlet chamber 22 than that existing in the inlet chamber 18 after the compartment 36 is initially locked against further movement relative to the housing 12. This proportioning action of the valve means 16 is represented by lines A–B and A'B' in FIG. 2.

When the brakes of the vehicle are released, the fluid pressure level in the inlet chamber 18 is reduced, thereby permitting the higher fluid pressure level in the outlet chamber 22 to urge the valve member 26 and poppet member 50 to the left relative to the housing 12 and to the valve member 28, the poppet member 50 remaining in sealing engagement with the valve member 26. As the valve member 26 moves to the left, the volume of the chamber 22 increases, thereby decreasing the fluid pressure level therein. This action is represented by lines B–C and B'C' in FIG. 2. When the fluid pressure level in the inlet chamber 18 is reduced to a value sufficiently below the fluid pressure level in the outlet chamber 22 such that the force due to fluid pressure acting on the poppet member 50 is sufficient to overcome the force of the spring 52, the poppet member 50 is urged out of sealing engagement with the valve member 26 to permit unrestricted fluid communication between the outlet chamber 22 and the inlet chamber 18. This state is represented by points C and C' in FIG. 2. After the poppet member 50 is urged out of sealing engagement with the valve member 26, substantially uninhibited fluid communication is permitted between the outlet chamber 22 and the inlet chamber 18. This action is represented by lines C–D and C'D in FIG. 2. When the pressure level in the outlet chamber 22 achieves the point represened by point D in FIG. 2, the fluid pressure level in the outlet chamber 22 has been reduced to a sufficiently low value to permit the spring 82 to return the valve member 26 toward the position illustrated in the drawing.

Since when the brakes are released the mass 40 is no longer being accelerated, the spring 54 returns the mass 40 to the position illustrated in FIG. 1, thereby permitting the finger 74 to move out of locking engagement with the serrations 80. Therefore, when the spring 82 returns the valve member 26 to the position illustrated in the drawings, the valve member 28 will also be returned, because of the engagement of the detents 64 and 66. After the members are returned to the position illustrated in the drawing, substantially uninhibited fluid communication continues between the outlet chamber 22 and the inlet chamber 18 until the brakes of the vehicle are fully released.

I claim:

1. In a control device for use in the braking system of a vehicle:
   a housing having an inlet, an outlet, and a bore communicating the inlet with the outlet;
   valve means within said bore dividing the latter into an inlet chamber and an outlet chamber;
   said valve means being responsive to the fluid pressure level communicated into said inlet chamber and to the rate fluid communication deceleration of the vehicle to permit substantially uninhibited fluidcommunication between said inlet and outlet chambers until a predetermined relationship exists between vehicle deceleration and the fluid pressure level in the inlet chamber and thereafter metering fluid communication between said inlet and outlet chambers to establish a lower fluid pressure level in said outlet chamber than the fluid pressure level established in said inlet chamber;
   said valve means including a pair of valve members slidable in said bore, and a mass operatively connected to one of said valve members;
   said valve members moving as a unit to permit substantially uninhibited fluid communication between said inlet and outlet chambers until a predetermined relationship exists between the rate of acceleration of said mass and the fluid pressure level in the inlet chamber, whereupon the other valve member moves relative to the one valve member to cooperate with the latter to meter fluid communication between the inlet and outlet chambers.

2. The invention of claim 1:
   said valve means including axially extending fingers interconnecting said valve members, said fingers having detents to connect the valve members for movement together, but permitting the other valve member to move toward the one valve member.

3. The invention of claim 1:
   said valve means including passage means extending through said other valve member and check valve means permitting fluid communication from the outlet chamber to the inlet chamber when the fluid pressure level in the outlet chamber exceeds the fluid pressure level in the inlet chamber.

4. The invention of claim 1:
   said valve means including a first set of fingers extending from said one valve member toward the other valve member and a second set of fingers extending from said other valve member toward the one valve member;
   each of said finger sets having detents cooperating with detents on the other finger set to permit movement of the valve members toward one another but to prevent movement of the valve members away from one another in excess of a predetermined distance; and
   resilient means yieldably urging said valve members apart.

5. The invention of claim 4; and
   spring means yieldably urging said first and second valve means toward a predetermined position within said bore.

6. The invention of claim 1:
   said valve means initiating metering of fluid communication between the inlet and outlet chambers when said mass is accelerated at a higher rate when the fluid pressure level communicated to said inlet chamber is at a relatively high level and when said mass is accelerated at a lesser rate when the fluid pressure level communicated to said inlet chamber is at a lower level.

7. The invention of claim 6; and
   latch means responsive to movement of said mass for locking said one valve member against movement relative to the housing to thereby initiate metering of fluid communication between said chambers;
   said latch means including spring means disposed between a fixed portion of said housing and said mass resisting movement of the latter, said spring means being deflected an increasing amount as the fluid pressure level in the inlet chamber increases, whereby an increasing rate of acceleration is required of said mass as the fluid pressure level in said inlet chamber increases to actuate said latch means for locking said one valve member against movement relative to the bore.

8. The invention of claim 1; and
   latch means responsive to the fluid pressure level in the inlet chamber and to acceleration of said mass for locking said one valve member against movement relative to the housing when said predetermined relationship between the fluid pressure level in the inlet chamber and acceleration of said mass exists;
   said control means including resilient means resisting acceleration of said mass with an increasing force as said resilient means is deflected.

9. The invention of claim 8:
   said valve means being responsive to the fluid pressure level in said housing to progressively deflect said resilient means as said fluid pressure level is increased.

10. In a control device for use in the braking system of a vehicle:
    a housing having an inlet, an outlet, and a bore communicating the inlet with the outlet;
    valve means within said bore dividing the latter into an inlet chamber and an outlet chamber;
    said valve means being responsive to the fluid pressure level communicated into said inlet chamber and to the rate of deceleration of the vehicle to permit substantially uninhibited fluid communication between said inlet and outlet chambers until a predetermined relationship exists between vehicle deceleration and the fluid pressure level in the inlet chamber and thereafter metering fluid communication between said inlet and outlet chambers to establish a lower fluid pressure level in said outlet chamber than the fluid pressure level established in said inlet chamber;
    said valve means including a pair of valve members slidable in said bore, and a mass operatively connected to one of said valve members;

said valve members moving as a unit to permit substantially uninhibited fluid communication between said inlet and outlet chambers until a predetermined relationship exists between the rate of acceleration of said mass and the fluid pressure level in the inlet chamber, whereupon the other valve member moves relative to the one valve member to cooperate with the latter to meter fluid communication between the inlet and outlet chambers; and latch means responsive to the fluid pressure level in the inlet chamber and to acceleration of said mass for locking said one valve member against movement relative to the housing when said predetermined relationship between the fluid pressure level in the inlet chamber and acceleration of said mass exists.

11. The invention of claim 4:

said latch means including a compartment receiving said mass, and arm members operatively connected to said mass and extending through said compartment, and means within said housing for engagement by said arms, said mass deflecting said arms into locking engagement with said last-mentioned means when said predetermined relationship exists between the fluid pressure level in said inlet chamber and acceleration of said mass, to thereby lock said one valve member against movement relative to said housing.

12. The invention of claim 5; and apertures extending through the walls of said compartment, said arm members extending through said apertures; and said means within said housing for engagement by said arms including detent means, said arm members being deflected into latching engagement with said detent means when said predetermined relationship exists between the fluid pressure level in the inlet chamber and acceleration of the mass.

13. The invention of claim 6:

said valve means including axially extending fingers interconnecting said valve members, said fingers having detents to connect the valve members for movement together, but permitting the other valve member to move toward the one valve member;

said fingers being retained on said one valve member by said compartment.

* * * * *